United States Patent [19]
Dustin

[11] 3,911,260
[45] Oct. 7, 1975

[54] SHOCK POSITION SENSOR FOR SUPERSONIC INLETS

[75] Inventor: Miles O. Dustin, North Olmsted, Ohio

[73] Assignee: The United States of America as represented by the United States national Aeronautics and Space Administration, Washington, D.C.

[22] Filed: May 30, 1974

[21] Appl. No.: 474,744

[52] U.S. Cl. .......... 235/151.34; 60/39.29; 137/15.2
[51] Int. Cl.² ...................... G06G 7/57; F02K 11/00
[58] Field of Search .................... 235/151.3, 151.34; 60/39.09 R, 39.29, 338; 137/15.1, 15.2; 244/53 B

[56] References Cited
UNITED STATES PATENTS

| | | | |
|---|---|---|---|
| 3,447,325 | 6/1969 | Tiley | 137/15.2 X |
| 3,456,871 | 7/1969 | Gösling | 137/15.2 X |
| 3,460,554 | 8/1969 | Johnson | 137/15.2 |
| 3,533,238 | 10/1970 | Marvin | 60/39.29 X |
| 3,552,873 | 1/1971 | Ghougasian | 60/39.29 X |
| 3,799,475 | 3/1974 | Mitchell et al. | 244/53 B |

*Primary Examiner*—Malcolm A. Morrison
*Assistant Examiner*—Jerry Smith
*Attorney, Agent, or Firm*—N. T. Musial; J. A. Mackin; John R. Manning

[57] ABSTRACT

Static pressure taps or ports are provided in the throat of a supersonic inlet and signals indicative of the pressure at each of the ports is fed to respective comparators. Means is also provided for directing a signal indicative of the total throat pressure to the comparators. A periodic signal is superimposed on the total throat pressure so that the signal from the static pressure tabs is compared to a varying scan signal rather than to total throat pressure only. This type of comparison causes each comparator to provide a pulse width modulated output which may vary from 0% "time on" to 100% "time on." The pulse width modulated outputs of the comparators are summed, filtered and directed to a controller which operates a bypass valve such as a door whereby air is dumped from the inlet to prevent the shock wave from being expelled out the front.

14 Claims, 4 Drawing Figures

SHOCK POSITION SENSOR FOR SUPERSONIC INLETS

ORIGIN OF THE INVENTION

The invention described herein was made by an employee of the U.S. Government and may be manufactured or used by or for the Government of the United States of America without the payment of any royalties thereon or therefor.

BACKGROUND OF THE INVENTION

An aircraft flying at supersonic speed has a shock wave which is normally positioned in the throat area of the air inlet associated with each of the jet engines on the aircraft. Under certain conditions, as for example a change in the angle of attach or the occurrence of gusts, the shock wave tends to move forward in the air inlet and may possibly be expelled from the front of the inlet. Such an occurrence would cause a sudden increase in drag on the aircraft which is at best highly undesirable.

Numerous schemes have been devised to inhibit the expulsion of the shock wave from the front of the air inlet, one of the most common being the use of bypass valves such as gates or doors downstream of the throat area. By opening these doors or valves when the shock wave tends to move forward from the throat area, massive amounts of air are dumped from downstream of the throat area tending to move the shock wave back downstream.

One prior art system for controlling the valves or doors utilized a shock wave sensor wherein comparator devices compared the static pressure of respective taps in the throat area of the air inlet to the total throat pressure. With this arrangement, any comparator connected to a tap downstream of the shock wave would be 100% "on", that is, it would have a constant output. On the other hand, any of the comparators connected to a static pressure tap upstream of the shock wave would not have an output and, therefore, would be "off" 100% of the time.

With the foregoing arrangement it will be seen that as the shock wave moves forward in the throat each comparator will change from an off to an on state producing an output. When these outputs are fed through a summing device, the output of the summing device increases or decreases in discrete increments as each comparator turns on or off. Because of the incremental step change in the output of the summing device, an undesirable hunting condition may occur because the valves or doors are controlled in increments and, consequently, may open too far, causing the shock wave to be repositioned downstream to a point where the door is required to close again.

OBJECTS AND SUMMARY OF THE INVENTION

It is an object of the invention to provide for a supersonic air inlet, a shock position sensor which will avoid an unstable hunting condition of the shock positioning valves or doors.

It is another object of the invention to provide apparatus wherein the static pressure at discrete points in a supersonic inlet throat are compared to a periodic scan signal superimposed on the total throat pressure signal to provide an easily filterable pulse width modulated signal.

It is another object of the invention to provide a shock position sensor apparatus wherein the total throat pressure with its superimposed scan signal may be adjusted to different levels for each of the respective static pressure tap signals to which it is being compared.

In summary, the invention provides apparatus for comparing the static pressure at points in a throat area of the supersonic air inlet to a scan signal superimposed on a signal representative of the total throat pressure to provide pulse width modulated signals which are summed and filtered to provide a control signal for bypass valves or doors in the air inlet.

DESCRIPTION OF A PREFERRED EMBODIMENT OF THE INVENTION

Figure 1:
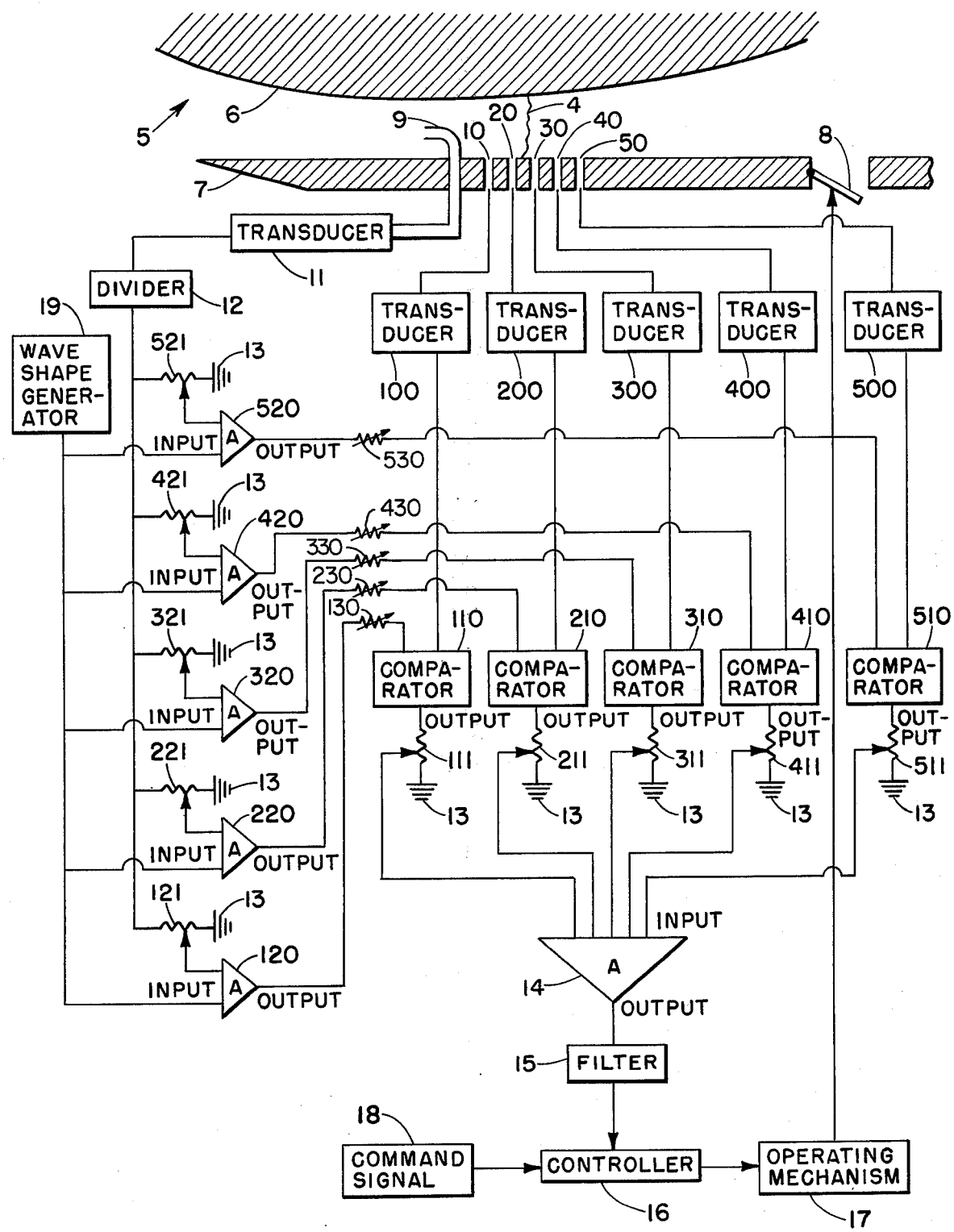
FIG. 1 is a schematic drawing of apparatus embodying the invention.

Referring now to FIG. 1, there is shown in longitudinal section a portion of a supersoic air inlet 5 including a center body 6 and an annular cowling 7 having a bypass valve such as a door 8 which may be positioned to prevent the shock wave in the inlet from being expelled out the front. Total throat pressure is measured by a tube 9 while static pressures in the throat area of the inlet are sent by static pressure taps or ports 10, 20, 30, 40 and 50. The static pressure taps 10, 20, 30, 40 and 50 communicate with the respective transducers 100, 200, 300, 400 and 500 each of which provides an electrical signal representative of the throat static pressure at each port to respective first inputs of respective comparator circuits 110, 210, 310, 410 and 510.

A transducer 11 communicates with the tube 9 and directs an electrical signal representative of total throat pressure to a divider 12 which may be a suitable resistor serving as a total throat pressure signal reducing means. From divider 12 the electrical signal is applied to total throat pressure signal adjusting potentiometers 121, 221, 321, 421 and 521 which are grounded as at 13 and each of which has an adjustable tap connected to respective first inputs of respective bias amplifiers 120, 220, 320, 420 and 520. As will be explained presently with respect to the graph shown in FIG. 2, the potentiometers allow the signal which is representative of total throat pressure to be adjusted to a desired level for each amplifier.

The output of each of the amplifiers 120, 220, 320, 420 and 520 is connected to a second input of comparators 110, 210, 310, 410 and 510, respectively. These connections may, if desired, include respective variable resistors 130, 230, 330, 430 and 530 which serve as composite signal adjusting means to provide a more precise adjustment relative to obtaining a prescribed output from the filter 15. The comparators are circuits which produce no output when the signal applied to a second input is of greater magnitude than the signal applied to a first input. However, should the signal on the first input become greater than the signal at the second input, the comparator will produce an output of some predetermined magnitude.

In order to add or sum the output signals of the comparators, the output of each is connected to respective potentiometers 111, 211, 311, 411 and 511 which are connected to the ground common 13 and each of which is provided with an adjustable tap connected to respective inputs of a summing amplifier 14. These potentiometers serve as means for selectively adjusting the magnitude of each of said pulse with modulated signals. The summing amplifier 14 has a summed output connected through a filter 15 to a controller 16. As will be explained presently, the filter 15 is of the low pass type which will pass signals of 100 Hertz or less while filtering out frequencies greater than that. Thus, filter 15 averages the output of the summing amplifier 14.

The controller 16 is circuitry of the type well known in the art and controls an operating mechanism 17 which opens or closes bypass door 8 in accordance with the control signal generated by the shock wave sensor; that is, the output of filter 15.

To the end that a scan signal will be superimposed on the total throat pressure signal, there is provided a wave shape generator 19 which supplies a periodically time-wise varying signal to a second input of each of the amplifiers 120, 220, 320, 420 and 520. In operation of the invention, it has been found that a preferred waveshape is a triangular waveshape which increases and decreases linearly at the same rate, and at a repetitive frequency of about 5,000 Hertz. However, other waveshapes such as sine waves or saw tooth waves may be used. A saw tooth wave is one which increases substantially linearly to a predetermined magnitude and returns nearly instantaneously to 0 value. While it is anticipated that still other waveshapes might be used, the triangular waveshape is the most satisfactory because of its linearity while increasing or decreasing, that is, during each scan cycle.

Figure 2:
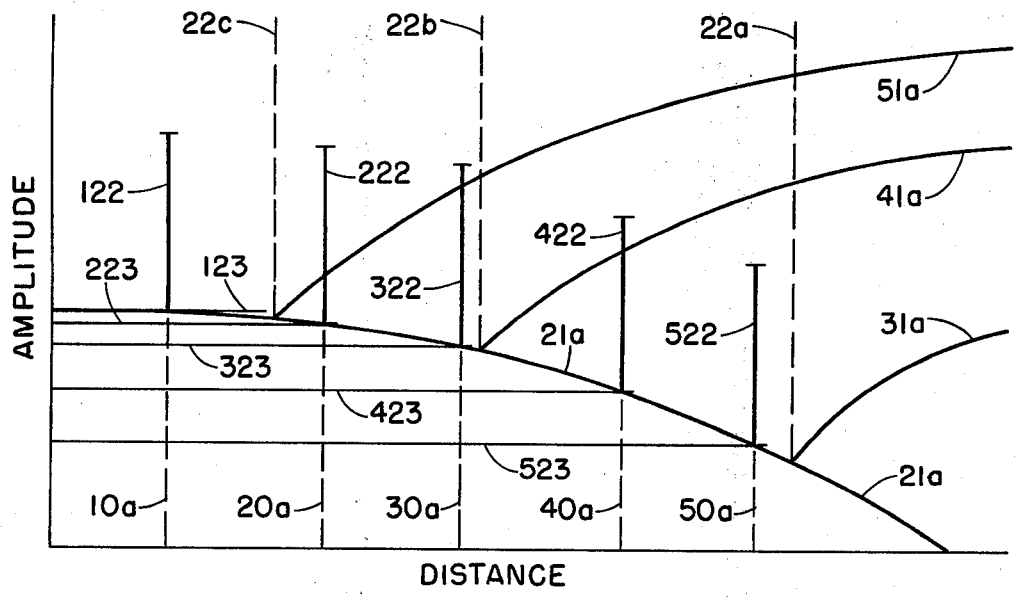
FIG. 2 is a graph illustrating the signals generated by various static pressures in a supersonic air inlet as well as showing a representation of a scan signal.

Operation of the above-described shock position sensor will be explained utilizing FIGS. 2 and 3. Referring first to FIG. 2, the curves 21a and 31a represent the static pressure profile in a supersonic inlet. The dashed lines 10a, 20a, 30a, 40a and 50a extending upwardly from the bottom of the graph represent the positioning of the static pressure taps in the inlet throat while the solid I-lines 122, 222, 322, 422 and 522 indicate the amplitude range of the scan signal which is superimposed on the total throat pressure to be compared to the static tap pressure by the comparators.

Assuming now that the shock wave 4 is downstream of the last static pressure tap 50, as indicated by the vertical line 22a in FIG.2, it will be seen that the static pressure profile curves 21a and 31a do not pass through any part of scan signal I-lines 522, 422, 322, 222 or 122. Assuming now that the shock wave 4 moves forward to a new position as represented by dashed line 22b, the portion 41a of the static pressure profile curve passes through the scan signal I-line 422 and is much greater than the scan signal 522. Accordingly, comparator 510 will be turned on 100% of the time while comparator 410 will produce an output during approximately 90% of the time of each scan cycle represented by the line 422.

If the shock wave now moves forward to a position represented by the line 22c, the portion 51a of the static pressure profile crosses the scan signal I-line 222 at approximately one-fourth of its height and crosses the scan signal I-line 322 at approximately 80% of its height and is also of much greater amplitude than the scan signal represented by I-lines 422 and 522. Thus, with the shock wave at the position represented by 22c, comparator 110 would be completely off, comparator 210 would be on about 25% of the time of each cycle, comparator 310 would be on for about 80% of each cycle while comparators 410 and 510 would be fully on, thus producing pulse width modulated signals which are summed by amplifier 14 and then filtered by filter 15.

In summary, then, with regard to FIG. 2, the static pressure profile curve downstream of the shock wave 4 is compared to a scan signal superimposed on the total pressure signal to produce on the comparators connected to respective static pressure taps, pulse width modulated signal which may vary in the range of from 0% on to 100% on. It should be noted in FIG. 2 that the I-lines 122, 222, 322, 422 and 522 representing scan signal magnitude are advantageously superimposed on the static pressure profile curve. This is accomplished by adjustment of the potentiometers 121, 221, 321, 421 and 521. By adjusting these potentiometers, the total throat pressure signal directed to the first input of each of the amplifiers may be adjusted in magnitude to the various levels as indicated by lines 123, 223, 323, 423 and 523 shown in FIG. 2 so that the scan signal may be advantageously made to follow the static pressure profile curve.

Figure 3:
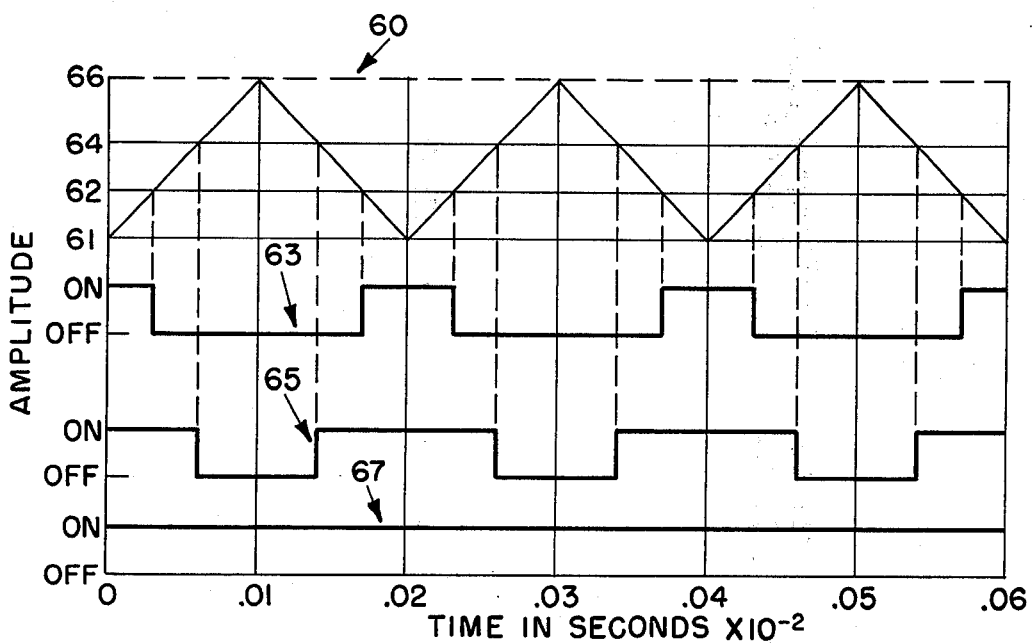
FIG. 3 is a graph illustrating the pulse width modulated signals generated by various levels of static pressure in the throat area of a supersonic inlet.

Referring now to FIG. 3, there is shown a preferred triangular wave shape scan signal 60 superimposed on a total throat pressure signal 61. Assuming now that the static pressure at the pressure tap increases to a level as shown at 62, the comparator would turn on for a portion of each cycle to produce a waveshape 63 which is on for approximately 30% of each cycle. If the static pressure at the tap now increases to a level 64, the comparator will be on for a longer time and will produce the waveshape as shown at 65 and which is on nearly 60% of the time. If the static pressure at the tap increases to a level as indicated at 66 or greater than that level, the comparator will be on 100% of the time, as indicated at 67.

Thus, as shown in FIG. 3 and in accordance with the invention, each comparator produces a pulse width modulated output by comparing throat tap pressure to a scan signal superimposed on a total throat pressure signal. The pulse width modulated waves are summed and filtered to provide a control signal to controller 16.

While the shock wave sensor embodying the invention preferably uses electronic amplifiers, comparators, summers, filters and waveshape generators, equivalent pneumatic circuits are available and may be substituted. However, electrical circuits have numerous advantages such as lighter weight, elimination of numerous hydraulic connections and lower cost.

Although the shock position sensor shown in FIG. 1 utilizes five static pressure taps, it will be understood by those skilled in the art that more static pressure taps and associated comparators may be utilized to obtain even more precise control. On the other hand, the sensor will operate using only one static pressure tap to produce a pulse width modulated output from a comparator.

Figure 4:
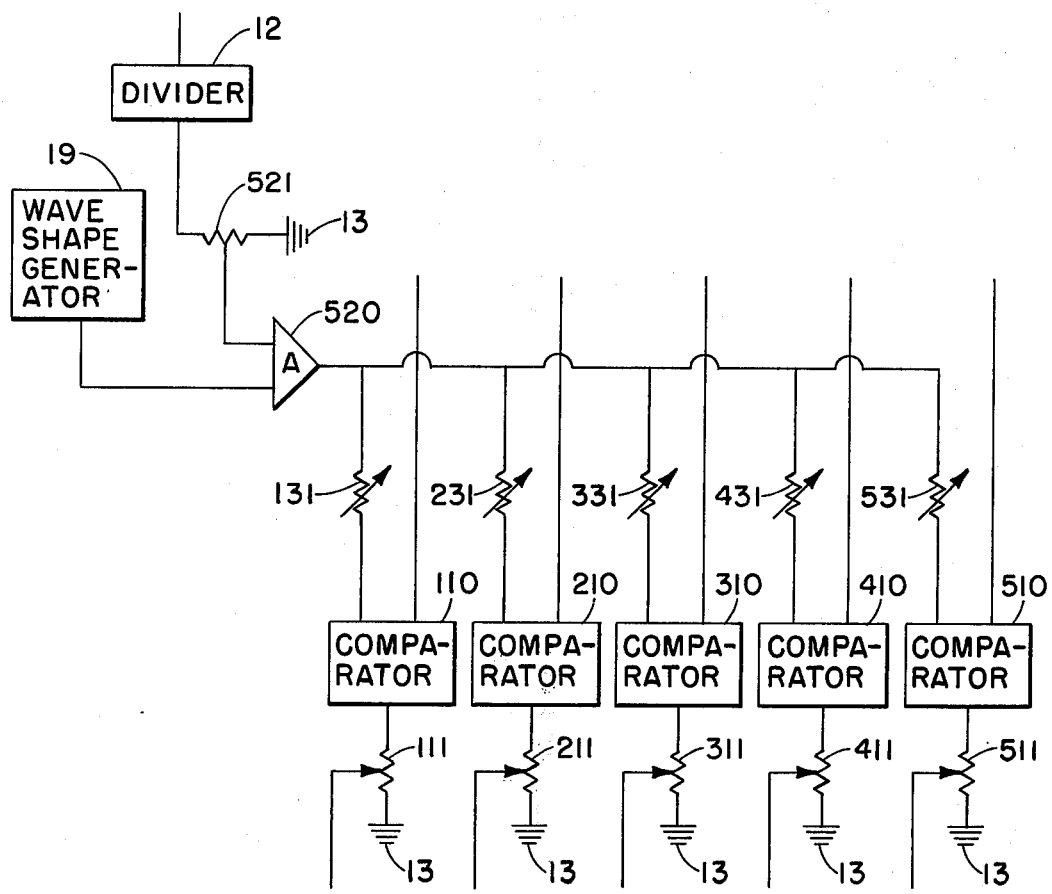
FIG. 4 is a schematic drawing of an alternate embodiment of the apparatus shown in FIG. 3 showing only as much of FIG. 3 as is necessary to understand the alternate embodiment.

Referring now to FIG. 4, there is shown an alternate embodiment of the sensor embodying the invention which will also operate, for example, by eliminating all but one of the amplifiers 120, 220, 320, 420 and 520. As shown in FIG. 4, the remaining amplifier 520 output is connected to the second input of each of the comparators 110, 210, 310, 410 and 510 through appropriately selected resistors or variable resistors 131, 231, 331, 431 and 531 which may be termed variable level selectors. Of course the waveshape generator 19 still would be utilized to provide a scan signal to the single amplifier. Also, as mentioned previously, a variety of waveshapes can be used for the scan signal. The scan signal may be superimposed on the total throat pressure signal, as discussed previously, or may be adjusted in level to vary above and below the total throat pressure signal. Basically, the signal applied to the second input of each of the comparators is a triangular or other suitable waveshape added to the total throat pressure signal.

It will be understood by those skilled in the art that changes and modifications may be made to the above-described shock position sensor without departing from the spirit and scope of the invention as set forth in the claims appended hereto.

What is claimed is:

1. A shock position sensor for a supersonic air inlet having a centerbody disposed in a cowling to form a throat and having a by-pass valve controlled by a controller in response to a control signal and comprising:
   means for generating a signal indicative of the total throat pressure of the air inlet;
   means for generating at least one signal representative of the static pressure at a point in the throat of the air inlet;
   means for adding a periodic, time-wise varying scan signal to said signal representative of total throat pressure to produce a composite signal;
   means for comparing said signal representative of the static pressure at a point in the inlet throat to said composite signal to produce a pulse-width modulated signal; and
   means for averaging said pulse width modulated signal to produce a control signal.

2. The apparatus of claim 1 wherein said periodic, time-wise varying signal is a triangular waveshape.

3. The apparatus of claim 2 wherein said triangular waveshape increases and decreases in magnitude substantially linearly and at equal rates with respect to time.

4. The sensor of claim 1 wherein:
   said second named means generates a plurality of signals representative of static pressure at a plurality of points in the throat;
   said fourth named means compares said plurality of signals representative of pressure at a plurality of points in the throat to said composite signal to produce a plurality of pulse width modulated signals; and including:
   summing means for adding said plurality of pulse width modulates signals to produce a summed signal for said fifth named means.

5. The apparatus of claim 4 and including means for selectively adjusting the magnitude of each of said plurality of pulse width modulated signals.

6. The apparatus of claim 4 wherein said means for adding a periodic, time-wise varying scan signal to said signal representative of total throat pressure comprises:
   a generator for producing a periodic, time-wise varying signal; and
   at least one amplifier having a first input connected to said means for generating a signal indicative of the total throat pressure, a second input connected to said generator, and an output at which there appears said composite signal.

7. The apparatus of claim 6 wherein said generator is a triangular waveshape generator.

8. The apparatus of claim 6 wherein said fourth-named means comprises a plurality of comparators, each amplifier having a first input, a second input and an output, each output being connected to a respective comparator, each second input being connected to said generator and each first input being connected to said means for generating a signal indicative of the total throat pressure.

9. The apparatus of claim 8 and including a plurality of composite signal adjusting means connected from said outputs of said amplifiers to respective comparators.

10. The apparatus of claim 8 and including a plurality of total throat pressure signal adjusting means connected between respective ones of said first inputs of said amplifiers and said means for generating a signal indicative of total throat pressure.

11. The apparatus of claim 6 wherein said fourth-named means comprises:
   a plurality of comparators each having a first input, a second input and an output said first input of each comparator being connected to said second-named means, said second input of each comparator being connected through respective variable level selectors to the output of said amplifier, the output of each comparator being connected to said summing means to provide a pulse-width modulated signal thereto.

12. The shock position sensor of claim 1 wherein said means for generating a signal indicative of total throat pressure comprises a forward-facing tube disposed between said centerbody and said cowling and a pressure-to-electrical signal transducer, said transducer communicating with said tube, the electrical signal of said transducer being directed to said means for adding a periodic time-wise varying scan signal to said signal indicative of total throat pressure.

13. The shock position sensor of claim 12 and including a total throat pressure signal reducing means connected between said means for adding a periodic time-wise varying signal and said transducer.

14. The apparatus of claim 1 wherein said means for generating at least one signal representative of the static pressure at a point in the throat of the air inlet comprises at least one static pressure tap in the throat of the inlet, a pressure-to-voltage transducer having a pneumatic input connected to said tap and having an electrical output which produces an electrical signal representative of the pressure at said tap.

* * * * *